(12) United States Patent
Foucher

(10) Patent No.: US 7,717,670 B2
(45) Date of Patent: May 18, 2010

(54) STATOR BLADES, TURBOMACHINES COMPRISING SUCH BLADES AND METHOD OF REPAIRING SUCH BLADES

(75) Inventor: Christelle Foucher, Acigne (FR)

(73) Assignee: SNECMA, Paris (FR)

( * ) Notice: Subject to any disclaimer, the term of this patent is extended or adjusted under 35 U.S.C. 154(b) by 588 days.

(21) Appl. No.: 11/405,458

(22) Filed: Apr. 18, 2006

(65) Prior Publication Data
US 2006/0245916 A1 Nov. 2, 2006

(30) Foreign Application Priority Data
Apr. 28, 2005 (FR) ................... 05 51112

(51) Int. Cl.
*F01D 9/02* (2006.01)
(52) U.S. Cl. ..................................... 415/160
(58) Field of Classification Search ................ 415/159, 415/160, 209.3
See application file for complete search history.

(56) References Cited
U.S. PATENT DOCUMENTS
2,957,228 A * 10/1960 Stoddard et al. ......... 415/209.3
5,039,277 A * 8/1991 Naudet ....................... 415/160
2004/0240991 A1* 12/2004 Bruce ........................ 415/160

FOREIGN PATENT DOCUMENTS
| EP | 1 400 659 A1 | 3/2004 |
| EP | 1 431 521 A2 | 6/2004 |
| EP | 1 482 129 A2 | 12/2004 |

\* cited by examiner

*Primary Examiner*—Richard Edgar
(74) *Attorney, Agent, or Firm*—Oblon, Spivak, McClelland, Maier & Neustadt, L.L.P.

(57) ABSTRACT

A platform for a turbomachine is fitted to a variable-setting stator blade to repair a worn area on a plate of the blade. The worn area may be caused by contact between the plate and a part of a casing during operation of the turbomachine. The plate may be machined before the platform may be properly fitted to the plate. The platform may include an anti-rotation tab to prevent the platform from rotating relative to an axis of rotation of a pivot of the blade. The platform may also include a collar to cover an outer diameter of the plate. After the platform has been fitted to the plate, the case may contact the platform instead of the plate.

11 Claims, 2 Drawing Sheets

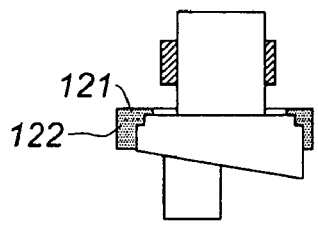
Fig. 7
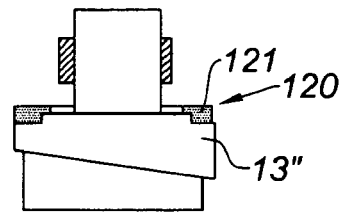
Fig. 8
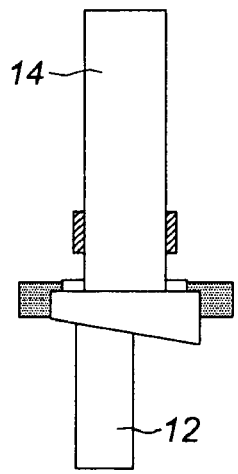
Fig. 9
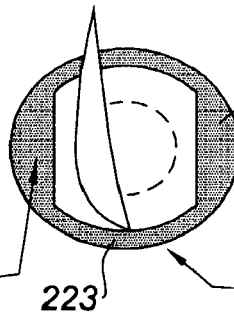
Fig. 11
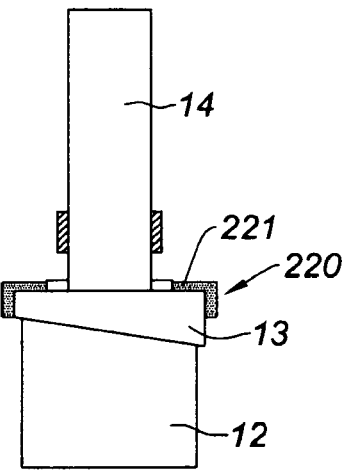
Fig. 10
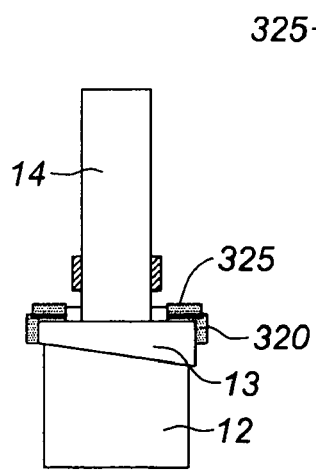
Fig. 12
Fig. 13
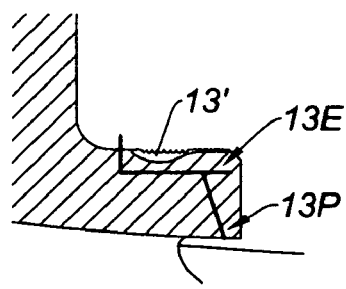
Fig. 14

STATOR BLADES, TURBOMACHINES COMPRISING SUCH BLADES AND METHOD OF REPAIRING SUCH BLADES

FIELD OF THE INVENTION

The present invention relates to the field of turbomachines and in particular to variable-setting stator blades.

BACKGROUND OF THE INVENTION

An articulated system, such as the variable-setting stator blades of a gas turbine engine compressor, comprises parts that move relative to one another. FIGS. 1 and 2 show schematically a variable-setting stator blade 1 mounted so as to rotate in the casing 3 of the machine. The blade comprises an aerofoil 12, a plate 13 and a shank forming a pivot 14. The pivot 14 is housed in a bore or radial orifice made in the casing 3 via various bearings. One of the bearings consists of a bush 4 in sliding contact with the shank forming the pivot 14, directly or via a shrink-fitted band 14'. The bush 4 fixedly attached to the casing in the bottom of a facing made in the wall of the latter is in contact with the plate 13 via an annular boss 4'. The opposite face of the plate 13 relative to the bush is swept by the gases of the stream. A washer 15 holds the blade in its housing. A lever 16, itself actuated by members not shown, controls the rotation of the blade about the axis XX of the shank to place the latter in the required position relative to the airflow sweeping the aerofoil. The relative movements result from the sliding of the contact surfaces, here the shank and the plate with the bushes. When the engine is operating, it is noted that the stresses to which the parts are subjected expose the contact surfaces to wear that may lead to losses of functionality of the system.

In the case of the assembly presented hereinabove, it is noted that wear occurs on the plate at the annular boss 4'. The worn zone begins by taking the form of a groove and then it extends over the whole plate. FIG. 3 shows a blade worn in this way. It can be seen that the plate 13 is hollowed out at 13'.

Currently, there is no satisfactory solution for repairing these blades.

The Applicant has set itself the objective of perfecting a repair solution that is simple to apply.

The solution of the invention should also be capable of being applied to new blades before they are placed in service in order to prevent the part from wearing. The solution should therefore also make it possible to reduce the wear of the plates and increase the gap between the periodic maintenance operations.

SUMMARY OF THE INVENTION

According to the invention, a variable-setting stator blade is provided, housed in a turbomachine casing, comprising an aerofoil, a plate and a pivot, characterized in that it comprises a platform fitted to the plate and pressing against the wall of the casing.

In particular, the blade plate being circular, the fitted platform is prevented from rotating relative to the axis of the pivot. To achieve this immobilization, there are several solutions, for example the platform comprises at least one anti-rotation tab interacting with a matching surface made on a lateral face of the plate. For example, the tab comprises a flat surface portion, parallel or inclined relative to the axis of the pivot, interacting with a matching surface of the plate.

According to another feature, the blade comprises a means of centring the platform relative to the axis of the pivot made between the plate and the platform. In particular, the centring means consists of an annular step machined on the periphery of the plate interacting with an annular step made on the inner surface of the platform. It may also be formed by a collar on the periphery of the platform interacting with the edge of the plate, if the space between the plate and the facing of the casing so allows. These two means are given as examples; other means are possible.

According to another feature, the pivot comprising an annular shrink-fitted band forming a bearing, the fitted platform has a central opening sufficiently wide to allow the platform to pass along the pivot and along the pivot/shrink-fitted band assembly.

According to another feature, the surface of the platform coming into contact with the casing has an appropriate surface artifice, a hardness. In particular, the surface comprises a coating of the tungsten carbide or other equivalent type, a brazed ceramic of the alumina or zirconia type in the form of one or more sectors or else a shrink-fitted ceramic of the alumina type, or else the surface has undergone a surface treatment of the shot-blasting, roller-burnishing or other type, or else the material of the platform is an alloy used for threaded fasteners (eg: cold-rolled nickel-based alloys) or for bearings (eg: extremely hard steels) chosen for its good friction properties in order to minimize the platform/bush wear.

BRIEF DESCRIPTION OF THE DRAWINGS

Now various embodiments of the invention will be described with reference to the appended drawings in which:

FIGS. 7 and 8 show a variant embodiment of the platform fitted to the plate of the blade, seen from the front and in profile, FIGS. 9 to 11 show a stator blade, seen respectively from the front, in profile and from the top, fitted with a platform according to another variant embodiment, FIGS. 12 and 13 show a stator blade, seen in profile and from the top, fitted with a platform according to another variant embodiment of the invention, FIG. 14 shows a partial view of a variable-setting stator blade before repair.

DETAILED DESCRIPTION OF THE DRAWINGS

Figure 1:
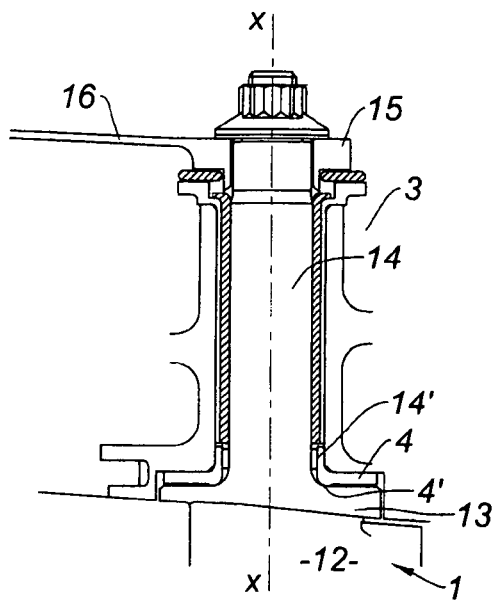
FIG. 1 shows schematically a portion of a variable-setting stator blade seen in section parallel to the axis of the engine, mounted in the compressor casing.
Figure 2:
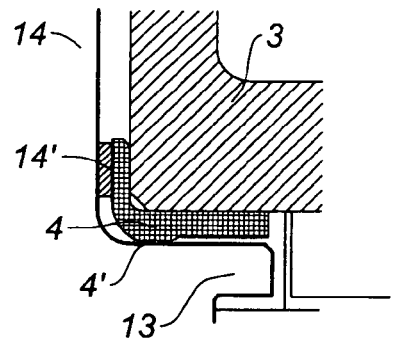
FIG. 2 is an enlarged view of the zone of contact between the plate and the casing bush.
Figure 3:
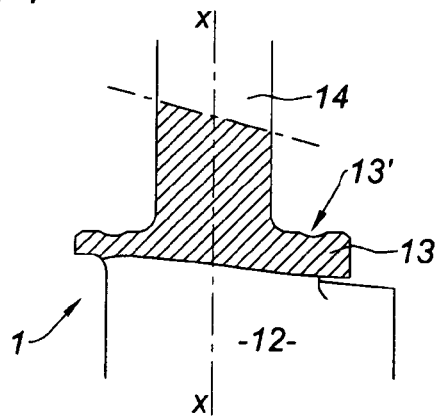
FIG. 3 shows a stator blade alone with a trace of wear.
Figure 4:
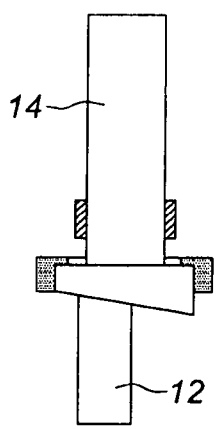
FIGS. 4 to 6 show schematically a stator blade seen respectively from the front, in profile and from the top, fitted with a platform of the invention.
Figure 5:
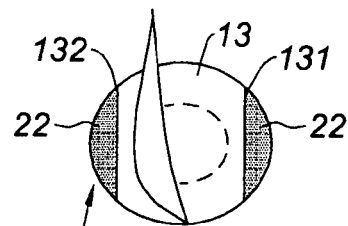
Figure 6:
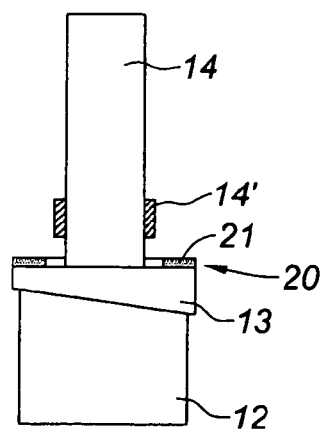

The stator blade is represented schematically. It comprises successively an aerofoil 12 swept by the gases, a plate 13 providing the continuity of the casing wall enveloping the stream of gas and a pivot 14 about whose axis the blade is rotated. The blade also comprises, according to this embodiment, a shrink-fitted band forming a bearing for the pivot. Conforming to the invention, according to the embodiment of FIGS. 4 to 6, a platform 20 has been installed on the face of the plate turned towards the pivot axis. The platform 20 comprises a first, disc-shaped portion 21 whose outer diameter is equal here to that of the plate 13. This disc is extended on the side of the aerofoil via two tabs 22, called anti-rotation tabs, which interact with two matching surfaces such as flats 131 and 132 machined laterally in the platform 13, parallel or inclined relative to the axis XX of the pivot. It can be seen that the disc 21 comprises a central opening of sufficient diameter to allow it to pass along the pivot beyond the shrink-fitted band 14'.

The fitted platform 20 constitutes a simple and effective means of protecting the plate 13 against the wear generated by the friction of the bush 4. When the blade is in place, the boss 4' of the bush 4 presses against the platform and not directly against the plate. The platform is prevented from rotating by the two tabs 22 perpendicular or inclined relative to the disc 21, that press against the surfaces 131 and 132. It may also be installed by sliding it along the pivot 14, without having to remove the shrink-fitted band from the latter.

One advantage of the solution is that it allows visual inspection of the surface state of the zone situated at the root of the pivot relative to the plate while not masking it. This zone is the seat of cracks; it must be easy to inspect.

FIGS. 7 and 8 show a variant of the solution in which an annular step 13" has been machined on the plate. The profile of this step matches that hollowed out in the platform 20'. The function of this step is to centre the platform relative to the axis of the blade.

The variant according to FIGS. 9, 10 and 11 shows a platform 220 that comprises a disc-shaped flat portion 221 and two tabs 222 as in the embodiment of the preceding figures. The assembly is surrounded by a collar 223 which, by covering the outer diameter of the plate, ensures both the centring of the platform and the protection of the edge of the plate in case of contact with the facing of the casing. This solution is to be considered if the clearance between the facing of the casing, forming the housing of the plate, and the plate of the stator is sufficient.

The platform is mounted when the stator blade is itself removed from the casing. The platform may be simply placed on the plate; however, according to a variant, provision is made for shrink-fitting the platform via the anti-rotation tabs on the plate when immobilization in the axial direction is desirable.

When the flats forming the housing of the anti-rotation tabs or the centring means are machined, sharp corners must be avoided. Bevelled or rounded corners are preferably adopted in order to prevent the initiation of cracks.

According to another feature, the fitted platform has a surface artifice intended to lengthen the lifetime of the contact zone.

According to one embodiment, a coating of the tungsten carbide type is added to the surface coming into contact with the bush. The platform is, for example, an alloy such as Z6NCT25 and the surface formed by HVOF spraying of the alloy WC/17% Co. The bush opposite is then an iron-based alloy such as Z12CNDV12 coated with tungsten carbide.

According to another embodiment, the hardness is increased via an appropriate surface treatment, such as ultrasound shot-blasting or roller-burnishing applied to a Z6NCT25-based alloy for example. A lacquer is advantageously added to promote running-in and prevent wear of the contact. In this case, the alloy Z12CNDV12 for example is used opposite a metal casing bush.

According to another embodiment, a ceramic element is brazed onto the surface of the platform 320, of the alumina type preferably in one or more sectors of washers 325, as is seen in FIGS. 12 and 13. According to the embodiment shown, the ceramic washer is brazed in three sectors onto the platform that may be an iron-, nickel- or cobalt-based alloy, for example Z6NCT25. Then a casing bush made of Z12CNDV12 is used.

According to a variant of this embodiment (not shown), the ceramic—zirconia or alumina—is in the shape of a washer shrink-fitted onto the platform made of an Fe-, Ni-, Co- or Ti-based metal alloy, for example Z6NCT25. In this case, a matching shape is machined on the surface of the plate in order to contain the washer by shrink-fitting.

Another solution consists in adding a retaining collar surrounding both the plate and the washer to be shrink-fitted. The bush mounted on the casing facing the plate is then advantageously made of metal, iron-, nickel- or cobalt-based metal, Z12CNDV12 for example.

A final solution consists in machining the platform out of a material of the alloy type used for threaded fasteners (eg: cold-rolled nickel-based alloys) or for bearings (eg: extremely hard steels). These materials are chosen for their good friction properties, which will thus make it possible to minimize platform/bush wear.

There follows a description of a method of repairing a stator blade that has not received the protective solution according to the invention. This case involves reconstituting a contact surface of the damaged plate.

FIG. 14 shows a portion of a stator plate having a worn zone 13'. Initially, a machining is made in a direction parallel to the plane of the plate 13 in order to remove a thickness 13E sufficient to make the plate flat. The edge of the plate is also machined so as to remove a portion 13P, in order to form a flat and allow an anti-rotation tab to be installed. This flat 131 or 132 is not aligned with the aerofoil of the blade. Preferably two flats are machined parallel to one another.

The plate thus machined is then fitted with a platform according to the invention. The disc of the platform occupies the annular space cut out by the machining of the plate, and the two anti-rotation tabs are slid along the flats made. The blade thus fitted is then reinstalled in the casing.

In the case of the most heavily worn blades, if the wear is deeper than the proposed rework zone, the repair by adding a platform still remains possible provided that the lifetime of the blade is not compromised. The platform then covers a worn zone that is not entirely removed.

The invention claimed is:

1. A variable-setting stator blade housed in a turbomachine casing, comprising:
   an aerofoil;
   a pivot;
   a plate; and
   a platform with a first face of a disc which is fitted to the plate and a second face of the disc, opposite the first face of the disc, which presses against a boss which extends radially inward from a first face of a bush sandwiched between the platform and the casing, the platform being prevented from rotating relative to a pivot axis of the pivot by at least one anti-rotation tab fixedly attached to the disc,
   wherein the disc is configured to allow a visual inspection of a surface situated at a root of the pivot relative to the plate while not masking the surface.

2. The blade according to claim 1, wherein the at least one anti-rotation tab comprises a flat surface portion, the flat surface portion protruding relative to a plane of the disc, and the flat surface portion being parallel to the axis of the pivot, and the flat surface portion interacting with a surface of the plate.

3. The blade according to claim 1, wherein a means of centring the platform relative to the axis of the pivot is provided between the plate and the platform.

4. The blade according to claim 3, wherein the centring means comprises an annular step on the periphery of the plate interacting with an annular step on an inner surface of the platform.

5. The blade according to claim 3, wherein the centring means includes a collar on a periphery of the platform, and the collar covers an outer diameter of the plate.

6. The blade according to claim 1, wherein the pivot comprises an annular shrink-fitted band which forms a bearing, and a central opening of the platform is sufficiently wide to allow the platform to pass along the pivot while the annular shrink-fitted band is attached to the pivot.

7. The blade according to claim 1, wherein a surface of the platform configured to come into contact with which contacts the casing includes a surface artifice intended to lengthen which lengthens the lifetime of a zone of contact with the casing.

8. The blade according to claim 7, wherein the artifice of comprises a coating of the tungsten carbide, a surface treatment shot blasting, roller burnishing, a brazed ceramic sector, a shrink-fitted ceramic, a cold-rolled nickel-based alloy, or a hard steel.

9. The blade according to claim 1, wherein a second face of the bush, opposite the first face of the bush, presses against the casing.

10. A turbomachine, comprising:
  at least one stator stage having a blade pivoting in a casing, the blade including
    an aerofoil,
    a pivot,
    a plate, and
    a platform with a first face of a disc which is fitted to the plate and a second face of the disc, opposite the first face of the disc, which presses against a boss which extends radially inward from a first face of a bush sandwiched between the platform and the casing, and the platform being prevented from rotating relative to a pivot axis of the pivot by at least one anti-rotation tab fixedly attached to the disc,
  wherein the disc is configured to allow a visual inspection of a surface situated at a root of the pivot relative to the plate while not masking the surface.

11. A method of repairing a variable-setting stator blade housed in a turbomachine casing, comprising:
  removing the variable-setting stator blade from the casing, the blade including an aerofoil, a plate, and a pivot attached to a shrink-fitted band;
  machining a portion of the plate in a direction parallel to a plane of the plate to remove a thickness sufficient to make the plate flat and machining an edge of the plate so as to form a flat, and the flat not aligned with the aerofoil;
  sliding a platform towards the plate so that the pivot and a shrink-fitted band pass through a central opening of the platform;
  fitting the platform to the plate so that a disc of the platform occupies an annular space cut out by the machining the portion of the plate and an anti-rotation tab of the platform slides along the flat cut out by the machining an edge of the plate; and
  reinstalling the blade in the casing.

* * * * *